Oct. 14, 1941.  J. B. BROWN  2,258,881
BRAKE
Filed May 20, 1938  4 Sheets-Sheet 1
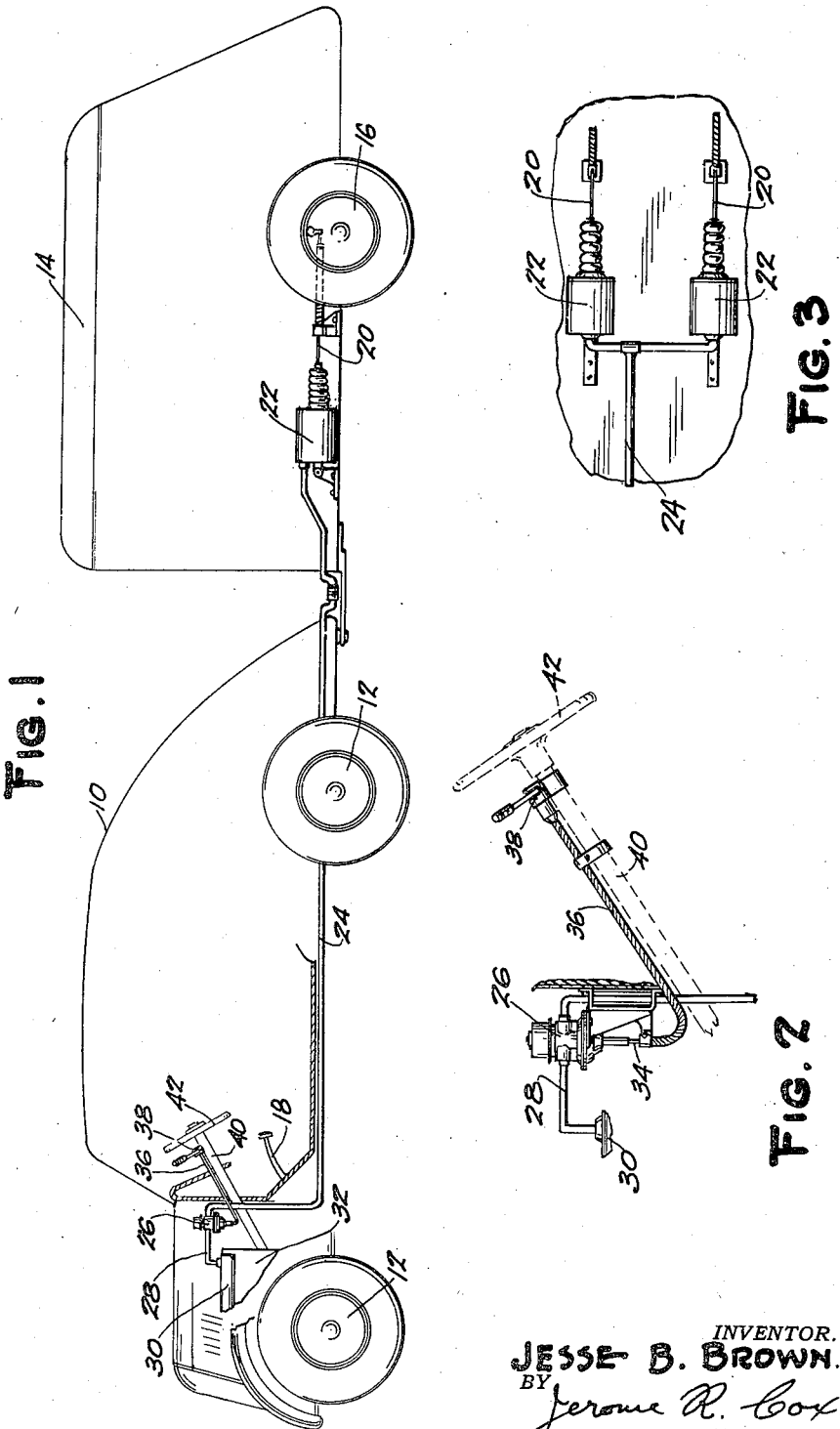
INVENTOR.
JESSE B. BROWN.
BY Jerome R. Cox.
ATTORNEY.

Oct. 14, 1941.　　J. B. BROWN　　2,258,881
BRAKE
Filed May 20, 1938　　4 Sheets-Sheet 2

INVENTOR.
JESSE B. BROWN
BY Jerome R. Cox.
ATTORNEY.

Oct. 14, 1941.  J. B. BROWN  2,258,881
BRAKE
Filed May 20, 1938   4 Sheets-Sheet 3
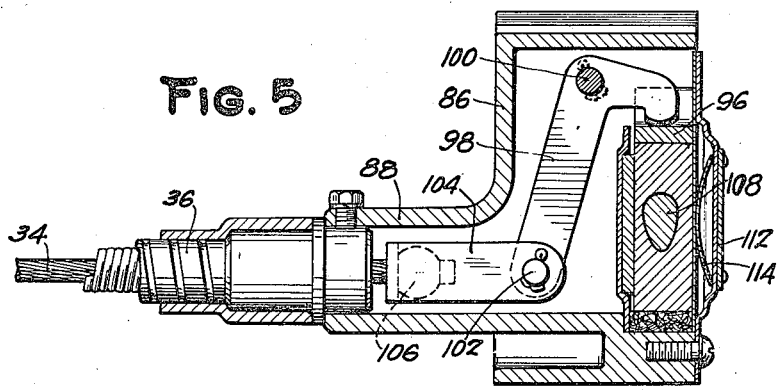
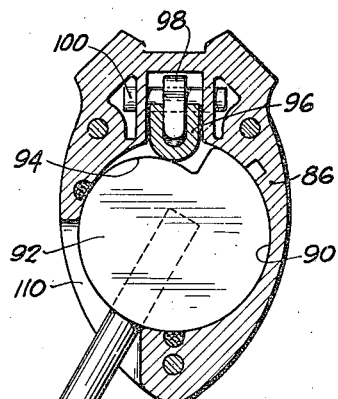
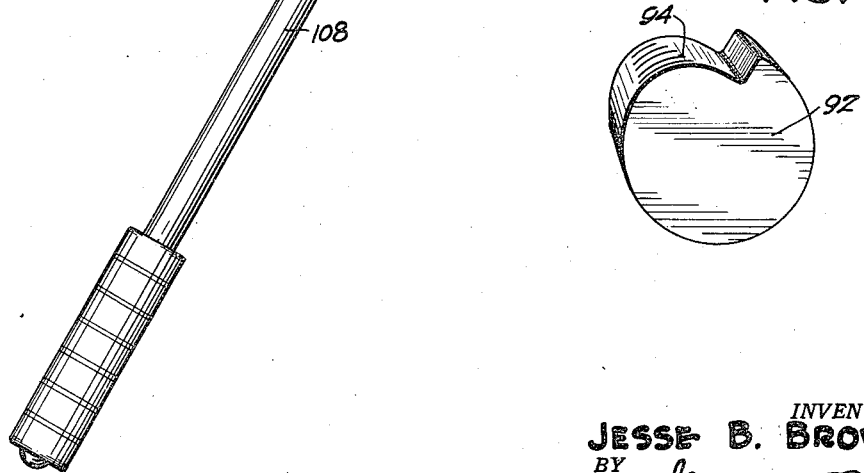
INVENTOR.
JESSE B. BROWN.
BY Jerome R. Cox
ATTORNEY.

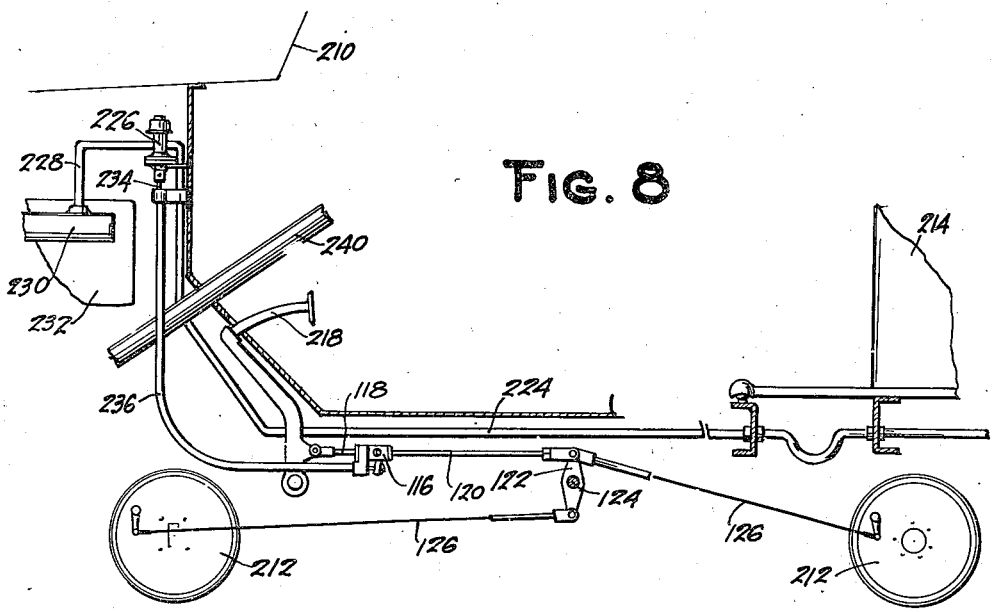
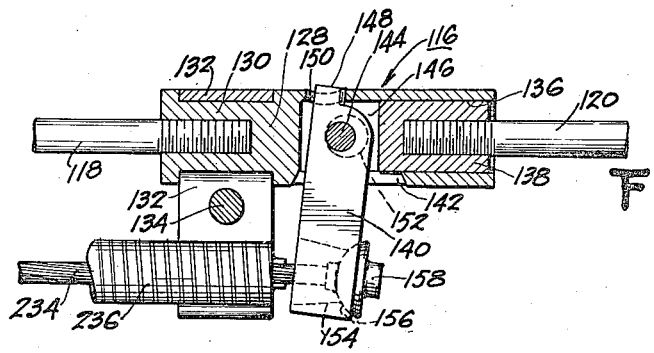
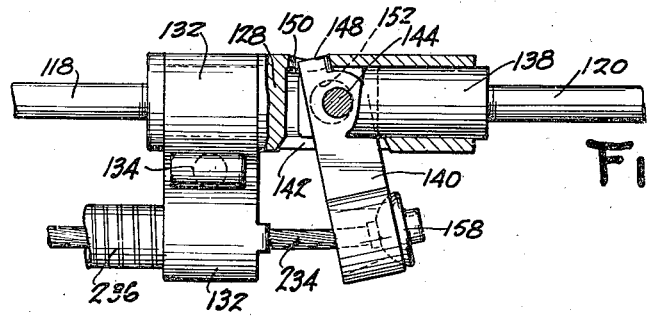
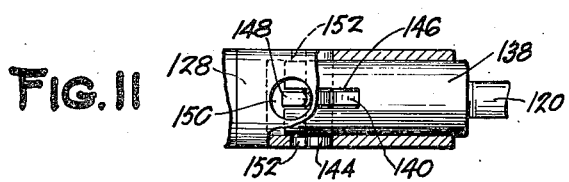

Patented Oct. 14, 1941

2,258,881

UNITED STATES PATENT OFFICE 2,258,881

BRAKE

Jesse B. Brown, Detroit, Mich., assignor to Bendix Products Corporation, South Bend, Ind., a corporation of Indiana Application May 20, 1938, Serial No. 209,004

7 Claims. (Cl. 188—3)

This invention relates to brakes and more particularly to power brakes for automobile trailers.

An object of the invention is to provide simple and easily installed power brake systems for trailers.

Another object is to provide a power brake system for trailers which can be installed on the automobile and trailer with substantially no modification of the automobile braking system.

Still another object is to provide such a system in which the trailer brakes are operated by the same means as the automobile brakes and with a force in substantially constant proportion to the force exerted on the automobile brakes.

Yet another object is to provide a simple hand operated control for the trailer brakes.

I prefer to accomplish these objects by using a valve for controlling the trailer brake power cylinder having a pressure responsive element subjected to the pressure applied to the power cylinder and tending to resist actuation of the valve, and by operating this valve through a resilient element by means of a Bowden cable whereby the valve may be installed in any convenient place on the car.

To provide movement of the Bowden cable I may use either a novel independent hand control or a simple and compact lever device adapted to be connected into the usual brake operating linkage of the automobile.

The above and other objects and desirable particular arrangements of parts will become apparent upon reference to the following detailed description of two embodiments of my invention shown in the accompanying drawings, in which:

Figure 1 is a diagrammatic representation of an automobile and trailer embodying my novel system with an independent hand control;

Figure 2 is a view showing parts of the automobile of Figure 1 on a larger scale;

Figure 3 is a partial plan view of the trailer of Figure 1 showing the brake operating power cylinders;

Figure 5 is a longitudinal section through my novel hand control device;

Figure 6 is a plan view thereof with the cover plate removed;

Figure 7 is a perspective view of the cam of the hand control device;

Figure 8 is a diagrammatic representation of parts of an automobile and trailer showing a modified system arranged to operate in conjunction with the normal operation of the automobile brakes;

Figure 9 is a longitudinal section of the novel lever device used in the modification of Figure 8 shown in its normal position;

Figure 10 is a view similar to Figure 9 showing the device in an operated position; and Figure 11 is a partial top plan view with parts in section of the device of Figure 9.

Figure 4:
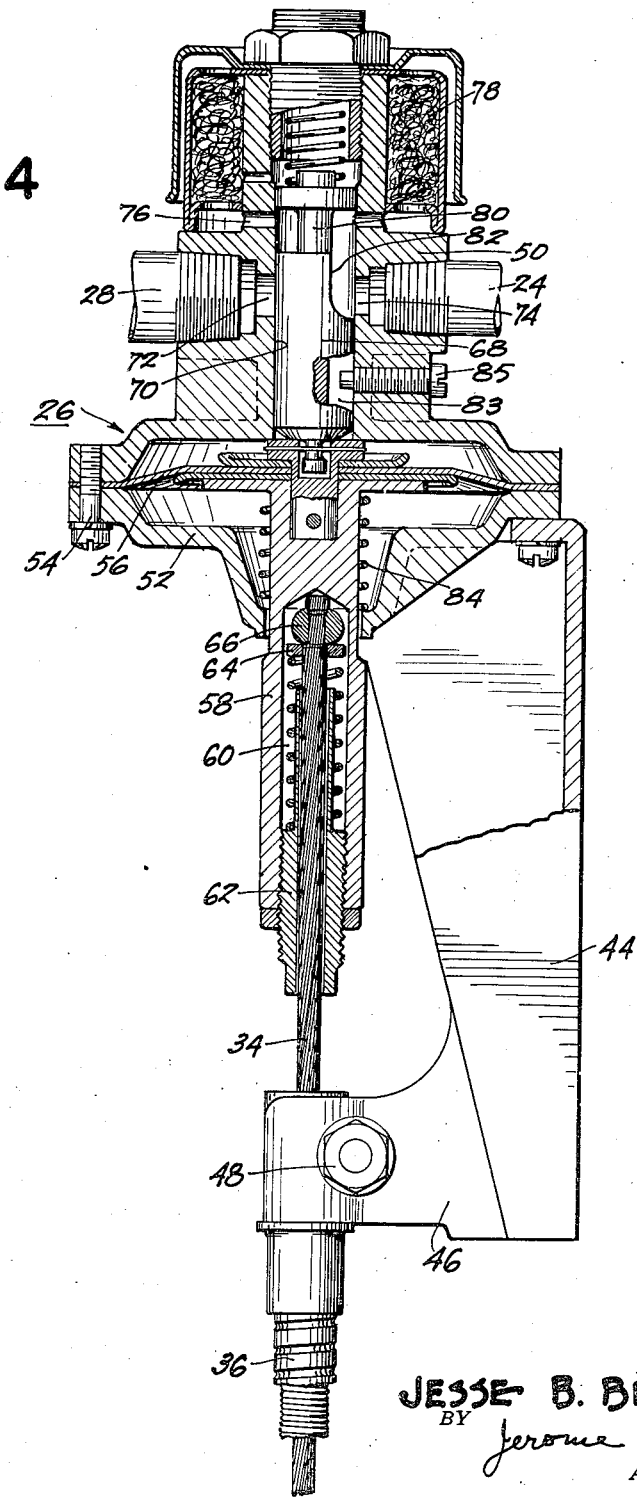
Figure 4 is a longitudinal section through the power brake control valve and its connection to the Bowden cable.

Referring now to Figures 1 to 8, there is shown an automobile 10 having brakes 12, and a trailer 14, attached to the automobile, having brakes 16.

The brakes of the automobile 10 are operated in any usual manner by means of a brake pedal 18.

The brakes of the trailer are operated by Bowden cables 20 each operably connected to a vacuum power cylinder 22 operable by vacuum supplied through a conduit 24 extending from the control valve 26 which in turn receives vacuum through a conduit 28 from the usual intake manifold 30 of the automobile motor 32.

The valve 26 is controlled through a Bowden cable 34 and conduit 36 extending to my novel hand control device 38 mounted on the steering column 40 of the automobile just below the steering wheel 42.

The valve 26 (see Figure 4) is preferably mounted in any suitable position on the vehicle chassis by means of a suitably formed bracket 44 having a clamping arm 46 arranged to clamp by means of a bolt 48, the end of the conduit 36 in axial alignment with the valve.

The valve comprises a body casting 50 and a cap 52 secured together by cap screws 54 which also serve to secure the valve to the bracket 44. The body casting and cap have clamped between them a flexible diaphragm 56 to the center of which is secured a socket member 58 projecting from the lower side thereof through an opening in the cap 52 to receive the end of the cable 34.

A compression spring 60, mounted in the socket member 58, is compressed between a sleeve 62, surrounding the cable and adjustably threaded in the end of the socket, and a washer 64 abutting against a ball member 66 swaged on the end of the cable. Thus the cable is resiliently connected to the diaphragm.

Also connected to the diaphragm 56 is a valve plunger 68 extending upwardly and slidable in a longitudinal bore 70 formed in the body casting.

The bore 70 is intersected by two diametrically opposed ports, a vacuum port 72 connected to the conduit 28 and an outlet port 74 connected to the conduit 24, and by an annular set of ports 76 spaced longitudinally from the first two ports and communicating with the atmosphere through an air cleaner 78.

The plunger 68 is formed with a reduced diameter portion 80 and a cutaway portion 82 so positioned that when the plunger is in its normal upward position, as shown, the ports 76 and 74 are brought into communication with each other while the port 72 is cut off, and so that when the plunger is moved downwardly the ports 76 are first cut off and then the port 72 is opened and brought into communication with the port 74. A coil spring 84 holds the plunger in its normal position.

The plunger 68 is also formed with a longitudinal slot 83 serving to transmit the pressures existing at the port 74 to the upper surface of the diaphragm 56 and also serving to receive one end of a screw 65 to prevent the plunger from rotating.

The novel hand control device 38 shown in detail in Figures 5–7 comprises a hollow cast casing 86 generally in the form of an oval cylinder having a hollow boss 88, projecting from one end, in which is fitted and clamped the end of the Bowden conduit 36.

The casing 86 is formed with a cylindrical seat 90 having rotatably seated therein a generally cylindrical cam member 92 having a portion cut away at 94 to form a cam engageable with a U-shaped cam follower 96 seated on the end of one arm of a bell crank lever 98. The bell crank lever 98 is pivoted at 100 on the casing 86 and its other arm is pivotally connected at 102 to a clevis 104 secured to the end of the Bowden cable 34 by means of a swaged on ball end 106.

A hand lever 108 pressed into a drilled hole in the cam member 92 projects through a slot 110 in the side wall of the casing 86.

The cam member is held in place in the casing 86 by means of a cover plate 112 and a bow-shaped spring 114.

Referring now to the operation of my novel system, when it is desired to apply the brakes 16 of the trailer 14, the hand lever 108 is rotated in a clockwise direction, as seen in Figure 6, thus rotating the cam 92 in its seat 90.

The rotation of the cam causes the cam surface 94 to rotate the bell crank lever 98 in a counterclockwise direction as seen in Figure 5 and thereby withdraws the cable 34 from the conduit 36.

At the valve 26, the cable 34 moves downwardly and, since the spring 60 is substantially stronger than the spring 84, moves the socket member 58 and the valve plunger 68 downwardly to close off the ports 76 and open the port 72.

The opening of the port 72 admits vacuum to the conduit 24 and the trailer power cylinders 22, causing them to apply the brakes 16 of the trailer.

At the same time vacuum is transmitted to the upper surface of the diaphragm 56 through the slot 83 formed in the valve plunger 68, whereupon the atmospheric air pressure beneath the diaphragm exerts an upward force thereon.

When the vacuum becomes low enough, sufficient force is exerted on the diaphragm to overcome the spring 60 and permit the plunger 68 to move back into a lapped position wherein both the air and vacuum ports are closed.

Further rotation of the hand lever 108 in the same direction will again move the valve plunger downward and again open the vacuum port 72 so that further evacuation of the cylinder takes place until the force exerted on the diaphragm 56 is increased sufficiently to compress the spring 60 further and again permit the plunger to move upward to its lapped position.

Upon a return movement of the lever 108, the valve plunger is permitted to move upwardly under the influence of the vacuum on the upper side of the diaphragm 56 until the ports 76 are opened to admit air to the system and reduce the vacuum therein.

The reduction of vacuum relieves part of the brake applying force of the trailer power cylinders 22 and also relieves some of the force on the diaphragm 56 so that the spring 60 is somewhat relieved and expands to draw the plunger 68 downwardly again to cut off the ports 76.

It will be seen then, that by my novel system the application of the brakes is accurately proportioned to the movement of the hand lever.

I prefer to form the cam 92 with a very gradual lift so that very little reaction is felt at the hand lever and in some instances I prefer to form the spring 114 of such strength that it will hold the hand lever by friction in any position to which it is moved despite the reaction resulting from the diaphragm 56 through the spring 60.

In the first instance, braking would be controlled both by feel and by position and in the latter case by position only, but the latter case has the additional advantage that the operator may have his hand free to perform other necessary operations in controlling the automobile.

In the system of Figures 8–11 inclusive (in which corresponding parts are designated by the same reference numerals plus 200) I have provided a device 116 for operating the Bowden cable 234 and the control valve 226 in accordance with the operation of the automobile brakes 212.

This device is connected between ends of portions 118 and 120 of a brake rod having the other end of the portion 118 connected to the pedal 218 and the other end of the portion 120 connected to a cross arm 122 positioned on a cross shaft 124 and also connected to brake rods 126 arranged to operate the automobile brakes 212.

This device comprises a socket member 128 threaded onto the brake rod portion 118 and formed with a reduced diameter portion 130 which receives a clamp member 132 adapted to secure the end of the Bowden conduit 236 by means of a bolt 134.

The socket member 128 is formed with a socket 136 telescopically receiving a plunger member 138 threadedly secured to the other brake rod portion 120.

A lever 140 projects through a slot 142 in the socket member 128 and is pivotally secured by a pin 144 in a slot 146 formed in the end of the plunger member 138.

A finger 148 on one end of the lever projects through a drilled hole 150 positioned in the socket member diametrically opposite to the slot 142 and the said finger engages the edge of the hole 150 as a fulcrum.

The pin 144 projects on each side of the plunger member 138 through holes 152 of larger diameter than the pin formed in the walls of the socket member 128 to form a lost motion device.

The other end of the lever 140 is formed with a hollow cylindrical portion 154 substantially in alignment with the conduit 236. The cable 234 projects through the cylindrical portion and the said portion is provided with a parti-spherical seat 156.

In operation, when the automobile brakes are applied by depressing the pedal 218, tension is created in the brake rod 118—120 whereupon the plunger 138 (which originally occupies the position relative to the socket member 128 shown in Figure 9) tends to be drawn from the socket member 128 and to carry the pivot pin 144 with it.

The movement of the pin 144 swings it about its point of contact with the edge of the hole 150 as a fulcrum to draw the cable 234 through the conduit 236 and operate the valve 226 in the same manner as has already been described with relation to the first embodiment.

The force exerted on the cable will be proportional to the force exerted on the brake rod 118—120 in the ratio of the distances between the pivot pin 144 and the points where the socket member 128 and the cable end member 158 engage the lever 140.

From the previous description, it is obvious that the valve will be actuated to admit a sufficiently low vacuum so that the force on the diaphragm 56 (referring to Figure 4) equals the force exerted on the cable.

Consequently, at least until full vacuum is admitted to the trailer power cylinder, the force exerted by the cylinder on the trailer brakes will be proportional to the force exerted on the automobile brakes 212 by means of the pedal 218.

While two illustrative embodiments of my invention have been shown and described in detail, it is not my intention that the scope of the invention should be limited by those embodiments or otherwise than by the terms of the appended claims.

I claim:

1. In an automobile and a trailer towed thereby, a braking system comprising brakes on the trailer, a power cylinder on the trailer operatively connected to the trailer brakes, a control valve on the automobile for controlling the power cylinder, means on the automobile for actuating the control valve positioned remotely therefrom, and a Bowden cable and conduit connecting the control valve and the valve actuating means, said automobile having brakes and means for actuating them, and said control valve actuating means including separable members connected in the automobile brake actuating means to be separated by actuation thereof and having the Bowden conduit connected to one of said members and having a lever pivoted on one of said members and engageable with the other and connected to the Bowden cable.

2. In an automobile and a trailer towed thereby, a braking system comprising brakes on the trailer, a power cylinder on the trailer operatively connected to the trailer brakes, a control valve on the automobile for controlling the power cylinder, means on the automobile for actuating the control valve positioned remotely therefrom, and a Bowden cable and conduit connecting the control valve and the valve actuating means, said control valve having a pressure responsive element providing a reaction against actuation proportion to the force exerted on the trailer brakes by the power cylinder, said automobile having brakes and means for actuating them, and said control valve actuating means including separable members connected in the automobile brake actuating means to be separated by actuation thereof and having the Bowden conduit connected to one of said members and having a lever pivoted on one of said members and engageable with the other and connected to the Bowden cable.

3. In a brake control a valve operating device comprising a casing, a cylindrical socket in the casing, a generally cylindrical cam rotatably seated in the socket, a lever secured to the cam and projecting through a slot in the casing, a cam follower engaging the cam, a bellcrank lever pivoted in the casing and having one arm engaging the cam follower, a Bowden conduit connected to the casing, and a cable in the conduit connected to the other arm of the bell-crank lever.

4. In a brake control a valve operating device comprising telescoping elements, a lever, a pin connecting the telescoping elements with lost motion and serving as a pivot for said lever on one of said elements, a projection on the lever engaging the other element, and a Bowden cable and conduit connected to the lever and one of the elements respectively.

5. In an automobile and a trailer towed thereby, a braking system comprising brakes on the trailer, a power cylinder on the trailer operatively connected to the trailer brakes, a control valve for controlling the power cylinder, brakes for the automobile, means for actuating the automobile brakes, and means on the automobile for actuating the control valve, said control valve actuating means including separable members connected in the automobile brake actuating means.

6. In an automobile and a trailer towed thereby, a braking system comprising brakes on the trailer, a power cylinder on the trailer operatively connected to the trailer brakes, a control valve comprising a casing and a valve element therein for controlling the power cylinder, brakes for the automobile, means for actuating the automobile brakes, and means on the automobile for actuating the control valve, said control valve actuating means including separable members connected in the automobile brake actuating means to be separated by actuation thereof and having the valve casing connected to one of said members and the valve element connected to the other.

7. A power brake control valve comprising a casing having a chamber therein and having a plurality of ports opening into said chamber, one of said ports being connected to vacuum, another being connected to air at atmospheric pressure, and a third being connected to a controlled cylinder, a plunger slidable in the chamber and adapted to alternately connect the vacuum port and the atmospheric port to the cylinder port while sealing the disconnected port from the cylinder port, a flexible diaphragm connected to the plunger and exposed on one side to the pressure prevailing at the cylinder port, a conduit connected to the valve casing, and a cable resiliently connected to the plunger for moving it in the aforementioned chamber, said cable extending through the conduit.

JESSE B. BROWN.